United States Patent
Nakamura

[11] 3,810,225
[45] May 7, 1974

[54] LENS SHUTTER FOR PHOTOGRAPHIC USE

[75] Inventor: Yukio Nakamura, Yotsukaido, Japan

[73] Assignee: Seiko Koki Kabushiki Kaisha, Tokyo, Japan

[22] Filed: Nov. 13, 1972

[21] Appl. No.: 305,687

[30] Foreign Application Priority Data
Nov. 19, 1971   Japan..........................46/092912
Nov. 19, 1971   Japan..........................46/108456
Nov. 19, 1971   Japan..........................46/108457

[52] U.S. Cl. .................................................. 95/63
[51] Int. Cl. ........................ G03b 9/06, G03b 9/24
[58] Field of Search................................... 95/63

[56] References Cited
UNITED STATES PATENTS
| | | | |
|---|---|---|---|
| 3,662,664 | 5/1972 | Goshima................ | 95/63 |
| 3,285,152 | 11/1966 | Fahlenberg et al..... | 95/63 |
| 3,375,769 | 4/1968 | Kiper..................... | 95/63 |
| 3,623,412 | 11/1971 | Kitai...................... | 95/63 |

*Primary Examiner*—Joseph F. Peters, Jr.
*Attorney, Agent, or Firm*—Robert E. Burns; Emmanuel J. Lobato

[57] ABSTRACT

A lens shutter for use in a camera for taking photographic exposures. The shutter has a single set of shutter blades for defining an exposure aperture and iris. The blades are operated by a ring actuated by an actuating lever variably positioned angularly by programming means to determine its angular rotation thereby to determine the extent of the opening of the iris. A main lever cooperating with and cammed by a driven main cam variable to angular extents drives the actuating lever and is variably adjusted as to its relationship with a governor variable as to the resistive force it applies as a braking force to the rotation of said ring thereby to control the speed of opening of the blades. A single programming or EV adjusting ring sets all the variable settings simultaneously including the exposure time in different and varied relationships constituting different programs settable by scales that are used in positioning the EV adjusting ring angularly to obtain the desired programs. The EV adjusting ring varies the angular relationship of the main lever and the actuating lever thereby varying the iris setting and one of the variables controlling exposure time, namely the extent of rotation of the shutter blade operating ring.

3 Claims, 5 Drawing Figures

LENS SHUTTER FOR PHOTOGRAPHIC USE

BACKGROUND OF THE INVENTION

This invention relates generally to cameras and more particularly to a programmable camera shutter.

In known programmable shutters, different sets of blades define the exposure aperture and iris. The mechanism for such known shutters is complex because different blade operating rings are used for the sets of blades. The governor coacts with different operating rings in controlling the blades in their opening and closing movements. The programming requires different setting elements and different inputs.

SUMMARY OF THE INVENTION

A principal object of the invention is to provide a programmable lens shutter in which a single input adjusting ring programs the various variables that must be controlled to effect a proper photographic exposure.

According to the invention, a lens shutter for taking photographic exposures has a single set of shutter blades operable to an open and a closed position for defining an exposure aperture and an iris variably. A shutter blade operating ring is driven rotationally different angular extents and at different speeds controlled by a programming arrangement in which a braking device or governor is variably adjusted as to resistance or braking force offered to the rotation of the operating ring. An actuating lever drives rotationally the ring and the programming means sets the angular extent of movement of this actuating lever to thus set iris opening and exposure time at the same time the braking device is variably adjusted as to cooperation with the actuating lever and its resistive force. Thus the exposure time, extent of iris opening defined by the blades are functions of each other.

A main lever cooperating with a main cam rotationally driven, after the shutter is charged, when released by a release lever upon triggering of the camera, drives the various elements. The programming is accomplished by an EV adjusting ring that simultaneously sets all the variables in the shutter. This adjusting ring has different cam portions for setting various EV programs as to exposure time, iris opening, and cooperates with a ring spring for variably adjusting the resistance offered by the spring to the blade operating ring in its rotation toward the direction for opening the blades.

Figure 1:
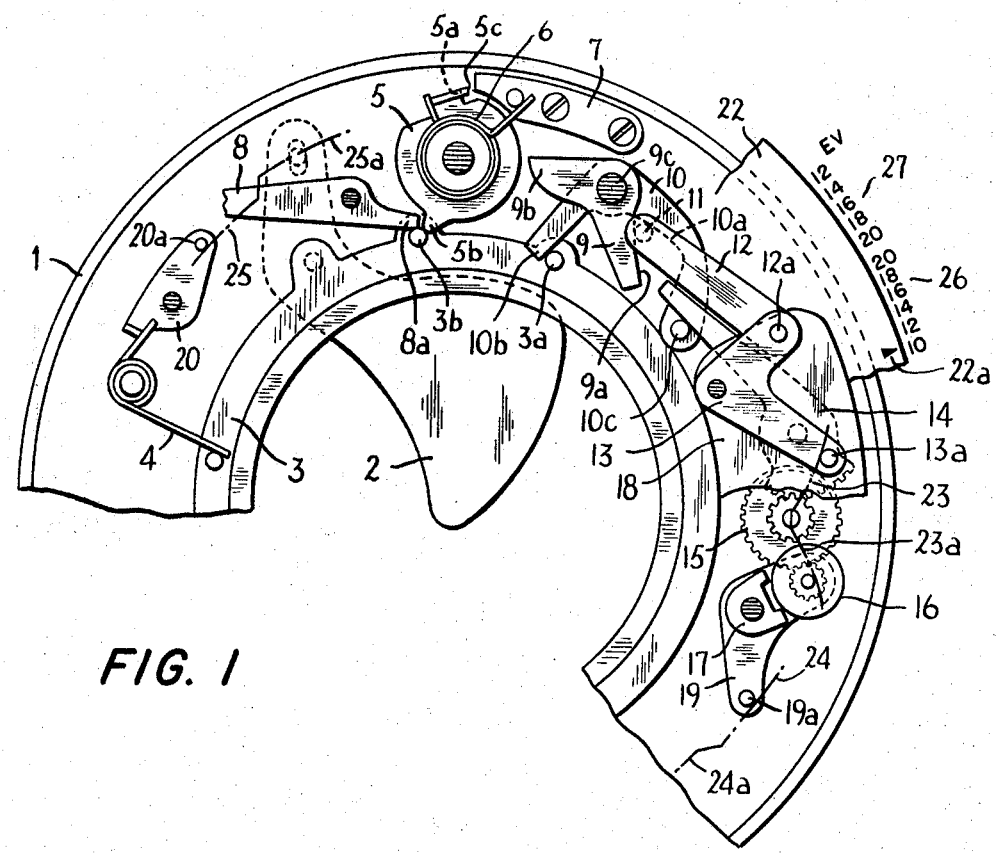
FIGS. 1-4, are fragmentary diagrammatic views of a shutter according to the invention illustrated in FIG. 1, the shutter in a cocked condition and in the other FIGS., the steps of the opening and closing of the shutter blades.

Other objects and advantages will appear from the following description of an example of the invention, and the novel features will be particularly pointed out in the appended claims.

DESCRIPTION OF THE PREFERRED EMBODIMENT

As shown in the drawings, a lens shutter according to the invention comprises a shutter case 1 within which are mounted the shutter members. A plurality of shutter blades 2, only one of which is shown in simplify the drawing, are mounted on a blade operating or driving ring 3 held from rotation by a ring spring 4 and a pivotally mounted main cam 5 which is biased in a clockwise direction by a main spring 6 held at a free end by a pin on a stop-plate 7. A projection 5b on the main cam 5 cooperates with a pin 3b on the blade-operating ring 3 and keeps the ring closing the iris or exposure aperture, not shown, in conjunction with the spring 4.

Figure 2:
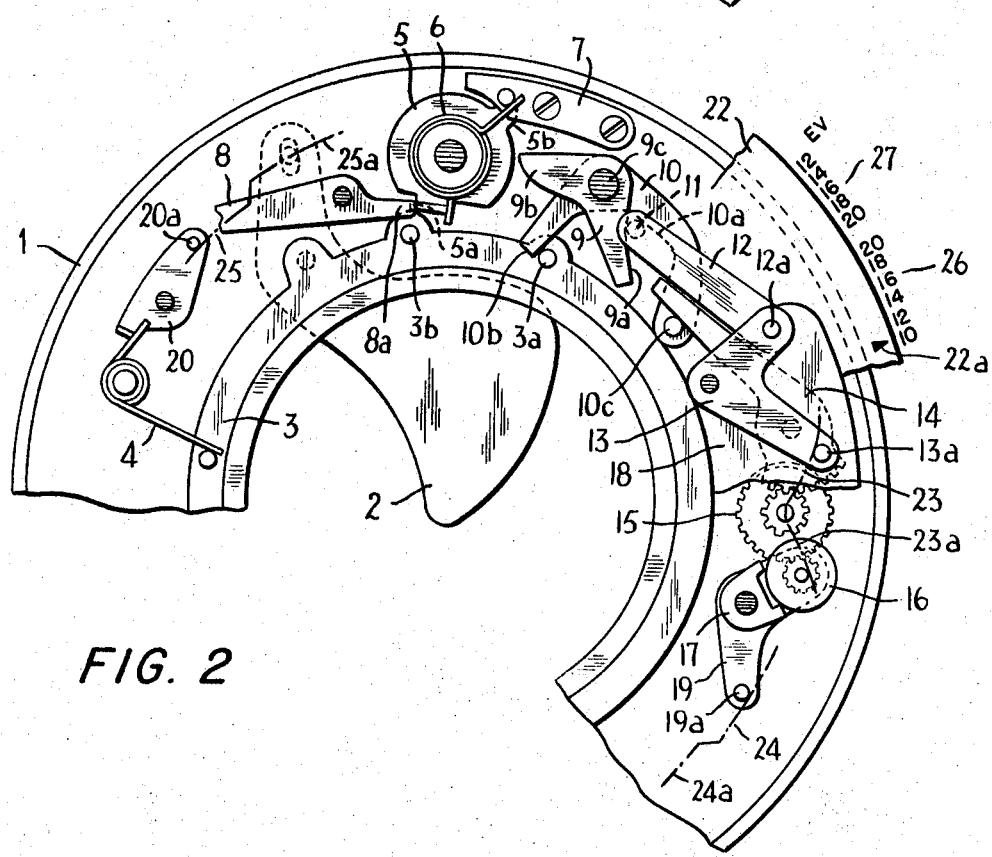

The shutter is charged by rotating the main cam 5, by means not shown, in a counterclockwise direction against the force of the main spring 6. The charging or cocking of the shutter is complete when a turned-up tab 5a on the main cam engages a projection 8a of the pivoted release lever 8, as shown in FIG. 2, and locked there. A main lever 9 is pivoted on a shaft 9c and is biased in a counterclockwise direction by a spring, not shown, and is rotated in a clockwise direction, when the shutter is charged, through the engagement of a second peripheral projection 5b of the main cam and an arm 9b of the main lever 9. However, before completion of the setting or charging of the shutter, the arm 9b is released by the main cam as it continues its rotation and it is restored to its initial position by its biasing spring.

A blade actuating lever 10 is also pivoted on the shaft 9c with the main lever 9 and an EV pin 11 is disposed between a cam or arm 9a of the main cam and a cam 10a of the blade actuating lever 10. The blade actuating lever 10 has an arm 10b functioning as a cam that engages a pin 3a on the blade operating ring 3. The blade actuating lever 10 is rotated in a counterclockwise direction to rotate the blade operating ring 3 in a clockwise direction for actuating the blades 2 in a direction opening the exposure aperture. Another arm of the blade actuating lever has a pin 10c cooperating with a governor later described.

The EV pin 11 is fixed on an EV lever 12 pivoted on a pivot 12a mounted on an arm of pivoted adjusting lever 13 which has a second arm carrying a pin 13a cooperating with an EV adjusting ring as later described. The blade actuating lever pin 10c bears on a first pivoted element or sector 14 of a governor, including a plurality or series of gear wheels 15, 16, controlling the speed or course of the opening of the shutter blades. The governor has an escapement or anchor 17 pivoted on an escape wheel on-and-off lever 19. The governor elements are pivotally mounted on a governor base 18 on which is also pivotally mounted the adjusting lever 13.

Figure 5:
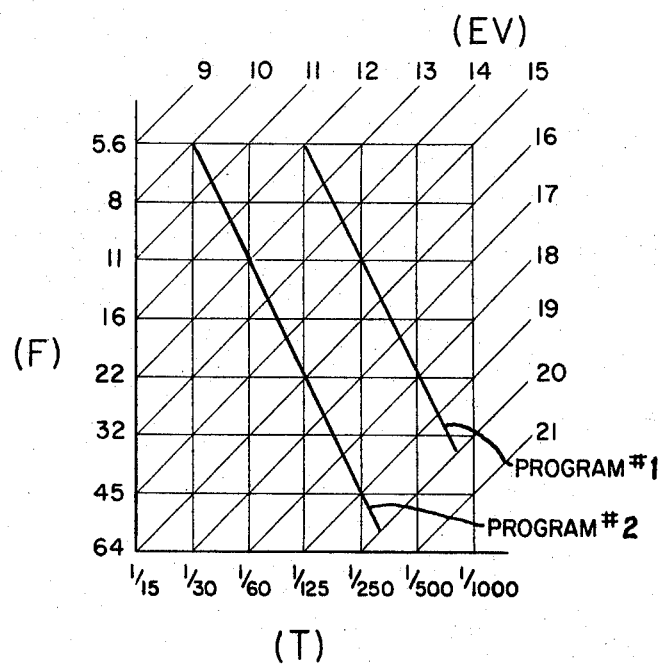
FIG. 5 is a diagram of EV programs settable in the shutter in FIGS. 1-4.

The resistive force of the spring 4 is adjusted by variably, angularly positioning a pivoted spring suspension or adjustment plate 20 having an upturned tab against which one end of the ring spring 4 bears and a pin 20a bearing on an EV adjusting ring 22. The EV adjusting ring is mounted rotationally for movement in opposite directions and has a plurality of cam surfaces thereon that function as later described. The EV adjusting ring 22 has an index mark 22a for cooperating with EV scale graduations 26, 27 for respectively setting the EV programs Nos. 1, 2 indicated in FIG. 5.

The EV adjusting ring has a cam portion 23 on which the pin 13a of the adjusting lever 13 bears when the EV program No. 1 is being set therewith and a cam portion 23a that cams adjusting lever 13 when the EV program No. 2 is being set. Cam portions 24, 24a on the EV adjusting ring cam the pin 19a of the escape wheel onand-off lever 19 for placing the escape wheel 16 into contact with the governor or taking it off therefrom to change the resistance of the governor. The EV adjusting ring has other next adjacent cam portions 25, 25a that cooperate with the pin 20a on the ring spring adjustment plate 20. When the shutter is programmed with the EV adjusting ring 22 for an exposure using EV program No. 2, the cam portion 25a cams the pin 20a of the spring adjustment plate 20 intensifying or increasing the resistive force of the ring spring 4.

Figure 3:
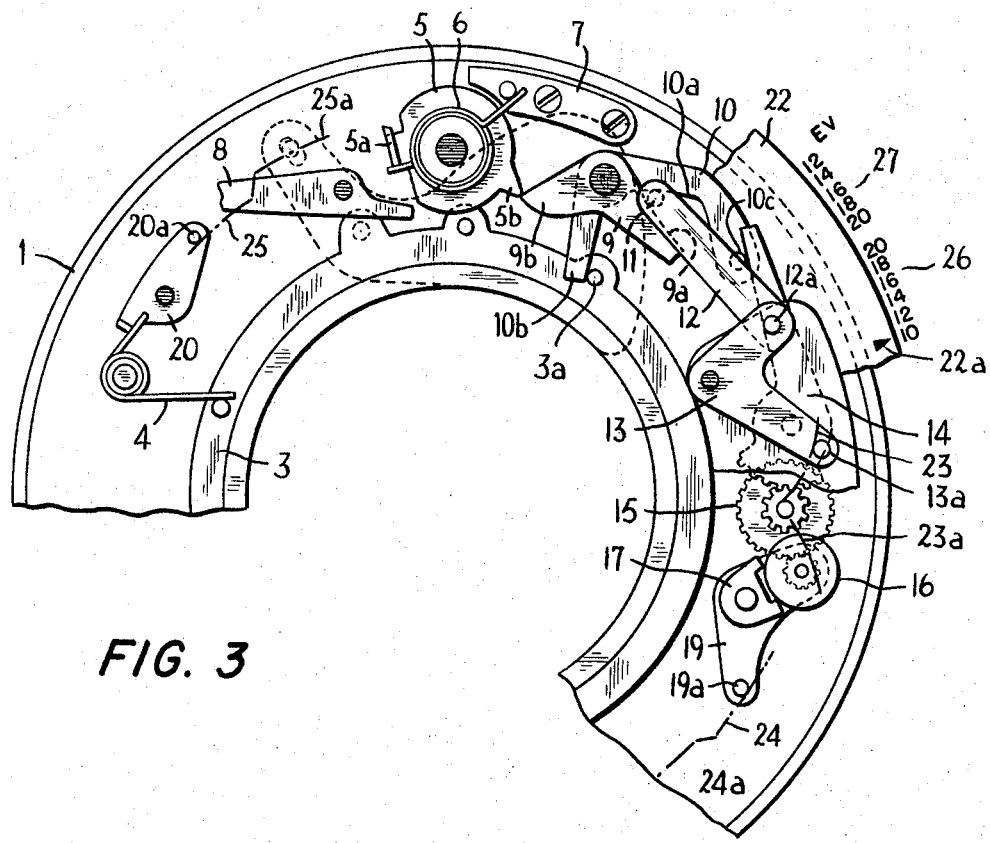

When the shutter is charged, it is released or triggered by the actuation of the release lever 8, which cooperates with the projection 5b on the main cam 5, upon actuation of the camera mechanism, not shown, for taking an exposure. Upon release of the main cam 5 for taking an exposure, it is rotated clockwise by the main spring 6. As the main cam rotates its projection 5b engages the arm 9b of the main lever rotating it counterclockwise. The counterclockwise rotation of the main lever effects rotation of the shutter blade actuating lever 10 through the connection or coupling established through the EV pin 11. The rotation of the blades actuating lever rotates the blade operating ring 3 to open the shutter blades. The shutter blades actuating lever 10 is coupled to the governor through its pin 10c so the shutter blades are opened gradually to the position shown in FIG. 3. The exposure aperture is thus opened. As the main cam 5 continues to rotate its projection 5b cams past the arm 9b of the main lever and it eventually again engages the blade operating ring's pin 3b thereby rotating the blade operating ring, with the cooperation of the ring spring 4, in a counterclockwise direction closing the shutter blades and completing the exposure.

Figure 4:
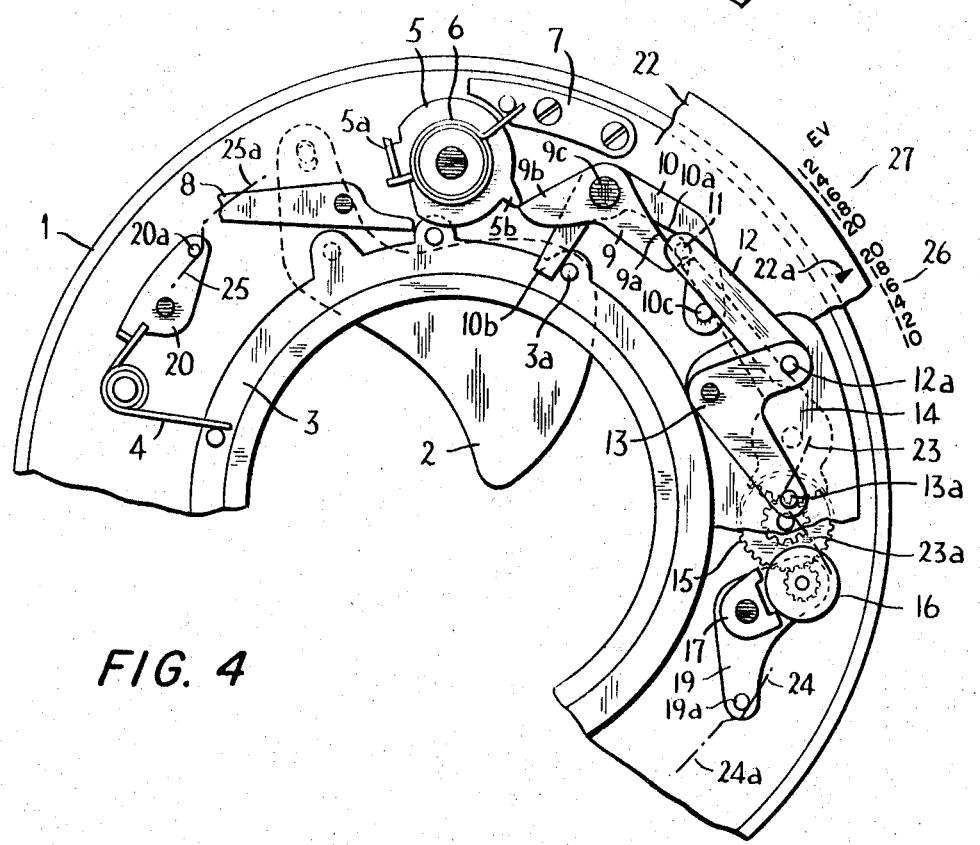

The EV adjusting ring 22 is rotatable clockwise and counterclockwise to make the various EV program settings, to vary the resistance of the governor thereby to vary the opening speed of the blades, to adjust the force of the ring spring 4 and to vary the angle of the actuating lever relative to the main lever with which it is coaxially pivoted. When the EV adjusting ring is adjusted counterclockwise, the adjusting lever 13 is rotated clockwise along the cam portion or surface 23, then the EV pin 11 shifts rightward, and the main lever 9 is displaced counterclockwise so as to reduce the contact extent or camming angular extent with the main cam 5 as well as the extent of action of the blade actuating lever 10 so that the engagement with the governor as well as the amount of rotation are also reduced, thereby resulting in a decrease of the exposure time and the iris aperture, FIG. 4.

On rotating the EV adjusting ring 22 counterclockwise still further and adjusting it within the exposure range of the program No. 2, the wheels of the governor beyond the escape wheel 16 are "cut off" thus reducing the governor's resistance and releasing the shutter blades earlier. The control of the engagement with the governor and the extent the blades are opened is achieved by the displacement of the EV pin 11 as before described relative to operation under program No. 1.

A more varied programming is obtained by variably varying the resistance of the governor. The degree, the extent of the opening of the iris and exposure aperture that the blades open and the extent of effect of the governor can be controlled simultaneously by the displacement of the EV pin disposed between the main lever and the blade actuating lever, and the many stepped programs are obtainable easily by varying the resistance of the governor.

What I claim and desire to secure by letters patent is:

1. A lens shutter for use in a camera for taking photographic exposures comprising, a plurality of shutter blades for defining an exposure aperture and an iris aperture, means for operating the blades to an open position defining an exposure aperture and to a closed position for closing the exposure aperture, braking means for variably controlling the speed of the opening of the blades to control the time of exposure, programming means simultaneously variably adjusting in related relationships the speed of the opening of the blades, the extent of opening of said blades thereby variably defining the size of an iris aperture and the exposure time, said braking means comprising a governor having means variably adjusted under control of said programming means for programming a plurality of braking resistance settings for variably braking said means for operating the blades when operating the blades to said open position, said means for operating said blades comprising a rotationally driven ring and an actuating lever rotating said ring, said programming means comprising means varying the extent of angular movement of said actuating lever thereby variably controlling the extent of rotation of said ring by said actuating lever, said programming means further comprising a main driving cam, a main lever cammed by said driving cam, another lever having a pin coupling the main lever and said actuating lever, and means for varying the position of said pin for variably positioning said actuating lever angularly relative to the position of said main lever.

2. A lens shutter for use in a camera for taking photographic exposures according to claim 1, including a spring for resisting rotation of said ring in a direction for operating said blades to an open position, and said programming means including means variably adjusting the resistive force of said spring, and said spring applying a force for rotating said ring in a direction for operating said blades to a closed position.

3. A lens shutter for use in a camera for taking photographic exposures according to claim 2, in which said programming means comprises an EV ring rotatable in opposite directions for setting different EV programs constituting said related relationships.

* * * * *